United States Patent [19]

Sukup

[11] 4,248,538
[45] Feb. 3, 1981

[54] GRAIN STIRRING APPARATUS AND METHOD

[75] Inventor: Eugene G. Sukup, Sheffield, Iowa

[73] Assignee: Sukup Manufacturing Company, Sheffield, Iowa

[21] Appl. No.: 877,951

[22] Filed: Feb. 15, 1978

Related U.S. Application Data

[63] Continuation-in-part of Ser. No. 859,161, Dec. 9, 1977, abandoned, which is a continuation of Ser. No. 774,156, Mar. 3, 1977, abandoned.

[51] Int. Cl.³ .............................. B01F 7/00; B01F 7/24
[52] U.S. Cl. ...................................... 366/261; 74/380; 74/665 L; 366/287
[58] Field of Search ............... 366/261, 281, 282, 283, 366/284, 287, 288; 74/603, 812, 380, 404, 415, 665 L

[56] References Cited

U.S. PATENT DOCUMENTS

| Re. 27,931 | 2/1974 | Sukup | 366/241 |
|---|---|---|---|
| 3,156,541 | 11/1964 | Kalke | 366/241 |
| 3,198,493 | 8/1965 | Sukup | 366/241 |
| 3,251,582 | 5/1966 | Murphy | 366/241 |
| 3,272,480 | 9/1966 | Sukup | 366/241 |
| 3,448,966 | 6/1969 | Sukup | 366/241 |
| 3,580,549 | 5/1971 | Murphy | 366/241 |
| 3,584,842 | 6/1971 | Sukup | 366/241 |
| 3,776,512 | 12/1973 | McKinnon | 366/241 |

OTHER PUBLICATIONS

Brochure entitled "Sukup Stirway" no date.

Primary Examiner—Robert W. Jenkins
Attorney, Agent, or Firm—Neuman, Williams, Anderson & Olson

[57] ABSTRACT

An apparatus and method are provided for effectively moving and stirring grain in a storage bin. The apparatus comprises a sweep arm, including an auger support shaft and an independently rotatable drive member, that extends between and is supported on a track along the bin sidewall and a pivotal support at the bin center. As the drive member is rotated, a drive wheel thereon moves over the bin track, causing the sweep arm to travel around the bin. The support shaft is rotatable independently of the drive member and extends from the central frame to a location adjacent the bin track. A plurality of spaced stirring augers depend from the laterally extending support shaft, and all except the outermost one are adapted for movement therealong. Rotation of the support shaft in either direction will cause corresponding movement of the movable stirring augers along the sweep arm. The outer auger remains near the outer wall of the bin. Movement of the stirring augers along the sweep arm, and of the sweep arm around the bin will result in an effective grain stirring path.

28 Claims, 9 Drawing Figures

GRAIN STIRRING APPARATUS AND METHOD

This is a continuation-in-part of copending application Ser. No. 859,161, filed Dec. 9, 1977, now abandoned, which was a continuation of application Ser. No. 774,156, filed Mar. 3, 1977, now abandoned.

This invention relates to apparatus and methods for stirring and moving grain in a storage bin, and more particularly apparatus and methods whereby substantially all grain within the bin will be stirred within relatively short time limits.

In a modern grain storage system, grain will frequently be stored in large quantities and for long periods of time within a storage bin. The grain may be dried in such bins by forced air ventilation through a perforated floor from a plenum beneath the floor, often with the air being artificially heated. The stored grain also may be subjected to aerating and tempering from time to time because of changes in the ambient atmosphere. In any event, it is important to allow the air to move freely and uniformly through the stored grain to prevent inadvertent development of areas of high moisture content and "hot spots" or spoilage of the grain. It is also desirable to provide for stirring and mixing of the grain during drying, to enhance the drying operation and to assure that grain adjacent to the plenum chamber will not be damaged by the heat.

The stirring apparatus and method, as proposed herein will assure controlled drying of a substantial depth of grain by providing uniform stirring or movement of substantially all grain contained within the typical circular storage bin. Practicalities prevent stirring the entire volume of stored grain at one time. However, substantially the same effect can be achieved by moving a plurality of stirring augers or the like around the bin. Thus, by establishing an effective stirring auger path, stirring of all of the grain can be provided within certain time constraints, and moisture-related grain storage problems can be prevented. This not only prevents overdrying of some grain, but cuts drying costs and increases the drying capacity of grain bins.

The general type of stirring apparatus with which this invention is concerned is shown in applicant's issued U.S. Pat. Nos. 3,272,480 and Re. 27,931. Generally, these references illustrate a rotatable sweep arm or carriage suspended between a central bin frame and an outer bin wall track. Stirring augers are carried along the sweep arm or carriage and are adapted for movement thereon while the sweep arm or carriage moves around the bin. Each of these configurations requires either a complex system and a separate motor along the bin track, the mechanical repositioning of guide wheels on stirring auger frames resting on the sweep arm, or hesitation in forward movement of the sweep arm to assure inward and outward movement of the stirring augers along the sweep arm while the sweep arm moves in the same direction around the bin. The present invention obviates these requirements by a simple uniaxial system which also attains both continuous circumferential advancement and simultaneous radial reciprocation of the stirrers. As such, this may be accomplished by using one or two drive motors. In certain embodiments, both drives may be effected from the center support area.

It is an object of the present invention to provide an improved apparatus and method for stirring grain in a storage bin.

It is a further object of this invention to provide an improved grain stirrer system with a simple sweep arm and drive arrangement which simultaneous will attain continuous circumferential advancement and radial reciprocation of the stirring units.

It is another object of this invention to provide an apparatus and method for moving grain whereby movement of the sweep arm around the bin and of the stirring augers on the sweep arm may be controlled at a central location.

Yet another object of this invention is to provide an apparatus and method for effectively moving an entire volume of grain within a storage bin within a predetermined time limit, while stirring grain adjacent the bin wall more frequently.

These objects are achieved by an apparatus and associated method for effectively stirring grain in a storage bin which includes a laterally extending sweep arm suspended between a pivotal support means located at the bin center and a bin track attached to the inner wall of the bin. The sweep arm includes a sweep drive element at the outward end in support and drive-engaging relation with the track means, and an auger support and movement element which is rotatable directionally independently of said drive element and at differing speeds. At least one stirring member is movably carried on said auger support and movement element and depends therefrom for extending into and stirring grain in the bin. Means are provided for moving the stirring member inwardly and outwardly along the support and movement element in accordance with the direction of rotation of that element. Drive mechanism is connected to selectively rotate or counterrotate the auger support and movement element and continually rotate the drive element in one direction during such rotation and counterrotation of said auger support and movement element. Thereby the drive element propels said sweep member along said track means in one direction while the selective reversing rotation of the auger support and movement element causes selective movement of said stirring member inwardly and outwardly along the sweep member.

In one illustrative embodiment of the invention, a plurality of stirring augers are mounted over the outer sleeve of the sweep arm and all but one of which are adapted for limited movement radially thereof. The moveable stirring augers rest on the sweep arm via a set of rollers or wheels which are canted relative to the direction of rotation of the outer sleeve. As the outer sleeve is selectively rotated in one direction and then in the opposite direction, the cant of the stirring auger wheels causes each moveable stirring auger to move along the sweep arm. The outer stationary stirring auger carries a tilt-detecting switch which halts the forward movement of the sweep arm when that auger has been tilted beyond predetermined limits.

Other objects, advantages and features of the invention will become apparent upon considering the following detailed description and appended claims, and upon reference to the accompanying drawings.

For a complete understanding of this invention, reference should now be had to the embodiments illustrated in greater detail in the accompanying drawings and described below by way of examples of the invention.

While the invention will be described in connection with various embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
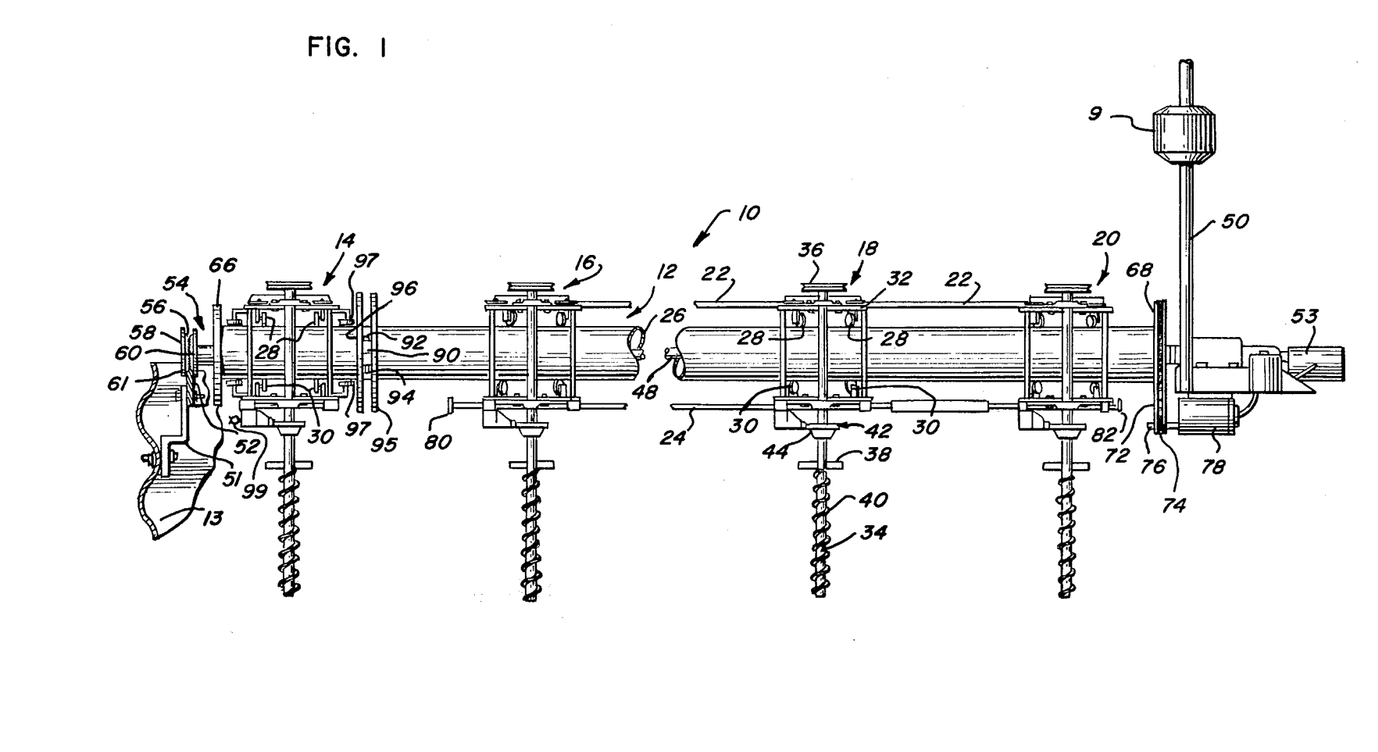
FIG. 1 is a side elevational view of an embodiment of an apparatus embodying principles of this invention shown suspended within a grain bin.

Turning now to the drawings and principally FIG. 1, one embodiment of the grain stirring or moving apparatus is shown generally at 10. The apparatus includes a laterally extending sweep support or arm member 12, which normally extends radially of a bin 13 in which it is mounted, and four stirring auger units 14, 16, 18, 20 which are supported on the sweep support member 12 and three of which 16, 18, 20 are adapted for radial movement along this support. The moveable stirring units are linked together by rods 22. The rods maintain the augers 16, 18, 20 at predetermined spaced intervals and assure correlative movement of the stirring units along the sweep arm 12.

Figure 3:
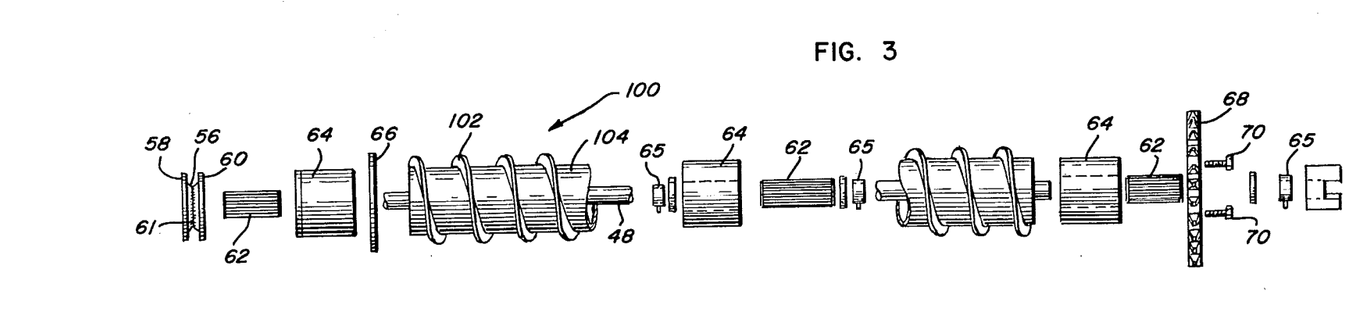
FIG. 3 is a fragmentary side elevational view of a second embodiment of the sweep arm of FIG. 2, shown in exploded relation.

Each stirring auger unit is supported on an outer support sleeve 26 of the sweep arm 12 by guide rollers 28, 30, which are attached to a stirring frame 32 of the auger unit. Guide rollers 28, 30 are canted on the moveable units 16, 18, 20, relative to the axis of the laterally extending sleeve 26, to facilitate movement of each stirring unit 16, 18, 20 along the sleeve 26, as further described hereinafter. Each stirring unit includes an auger shaft 34 which extends downwardly through openings in frame 32 and into grain therebelow (not shown). A V-pulley 36 is affixed to the upper end of each shaft 34 and is adapted to be engaged by a belt which is driven by an auger motor (now shown), mounted as shown in FIG. 3 of U.S. Pat. No. Re. 27,931 and attached to frame 32 on the trailing side of the sweep arm 12. The auger motor counterbalances the weight of auger 34 and tends to urge the depending auger forwardly about the axis of the sweep tube 12 and into the grain as the sweep arm advances. A clearing blade 38 is secured to shaft 34 above shaft flighting 40 to keep grain from being drawn up and into the auger motor by flights 40, as the stirring auger is operated. An electrical safety switch 42 is provided along each auger shaft 34 to stop the sweep motor if an inordinate amount of resistance is encountered by a shaft 34, or if the belt through a V-pulley 36 breaks which would result in stopping shaft rotation. Three heavy steel balls (not shown) are carried within switch housing 44 and are caused to roll up angled housing sidewalls by centrifugal force when the shaft is at speed. This raises a top plate to close a control switch in the power circuit to the sweep drive motor 53. If a shaft 34 loses speed, the respective balls move down the sidewalls, and permit the electrical contacts to open. Thus, the sweep arm stops if any stirring auger stops and prevents damage to the stirring equipment.

The sweep arm member 12 includes the hollow cylindrical outer support tube or sleeve 26 and an inner drive shaft 48. The outer support sleeve or tube 26 encircles the inner shaft 48 and extends over substantially its entire length, providing the beam strength of the arm 12. The sweep arm 12 is suspended by the inner drive shaft 48 between a privotal central frame 50 and a bin track 52. The bin track 52 is circular and is mounted along the upper inner periphery of the bin wall 13 via brackets 51. The central frame 50 is suspended from the bin roof (not shown) and is adapted for pivotal movement at bushing 9, about the bin center.

A gear motor 53 is mounted on frame 50 and connected to the drive shaft 48 for rotation when activated. The opposite end 54 of drive shaft 48 extends beyond outer sleeve 26 and over bin track 52. A drive wheel 56, mounted on end 54 of shaft 48, is adapted to ride between its two extending flanges 58, 60 (see FIG. 2) on bin track 52 and may be formed with serrations 61 for traction engagement with the track. When drive motor 53 is activated causing drive shaft 48 to rotate, drive wheel 56 will move along bin track 52 and cause sweep arm 12 to traverse the bin circumferentially, pivoting about the bin center. The inner shaft 48 extends substantially coaxially of the outer tube 26, and is maintained in position by a plurality of bushings and bearings 62, 64 (FIG. 2) between the shaft 48 and tube 26. The center bushing and bearing unit is maintained in axial position relative to tube 26 and shaft 48 by securing stop collars 65 on shaft 48 on either side of the bushing. The end bushings 64 may be attached to the tube 26 during assembly, as by welding.

The sleeve 26 is slightly shorter than the shaft 48, and is provided with a stop disc 66 on one end and a drive disc or sprocket 68 on the opposite end. A split plate or collar 90 is clamped around the outer sleeve 26 at a position adjacent the outermost auger unit 14, by securing two semi-circular halves thereof together with bolts 92, 94. The split plate provides a smooth surface on each side 95, 96 thereof. Upstanding disc 68 and split plate 90 limit the extent of stirring auger movement along sweep arm 12. Discs 66, 68 are either welded or secured by screws 70 to outer sleeve 26.

A drive chain 72 (FIG. 1) is carried around sprocket or drive disc 68 and a corresponding power sprocket 74 secured to motor shaft 76 extending from a reversible gear motor 78. Because motor 78 is secured on pivotal central frame 50, as the sweep arm 12 moves around the bin the relation between the motor 78 and sleeve 26 will remain the same. When the sleeve motor 78 is activated, it will cause tube 26 to rotate. Because this outer support tube or sleeve 26 is rotatably mounted on inner shaft 48, rotation of the sleeve can be independent from the rotation of inner shaft 48.

The outwardly facing surface of sleeve 26 is substantially circular and smooth, providing an unobstructed surface over which guide rollers 28, 30 may roll. Because the guide rollers on auger units 16, 18 and 20 are canted, relative to the direction of sleeve rotation, the units will traverse the sweep arm 12 when the outer sleeve is rotated. The distance traveled by stirring augers 16, 18, 20 along sweep arm 12 during each rotation of outer sleeeve 26 will be directly related to the angle of the cant of guide rollers 28, 30, relative to the axis of the tube 26. If the direction of the sleeve rotation is reversed, a corresponding reversal of stirring auger movement along the sweep arm 12 will result. Auger unit 14 will not move along sweep arm 12, because its guide rollers are not canted.

A switch rod 24 extends between stirring augers 16, 18, 20 on the underside of frame 32 and is adapted for limited axial sliding movement. As the auger units approach either split plate 90 or drive sprocket 68 on opposite ends of outer tube 26, a knob 80 or 82 secured to each end of rod 24 will abut against the upstanding face of the corresponding disc 68 or split plate 90. As the auger units continue to move axially, the rod 24 is displaced relative to the auger units, tripping a reversing switch on one frame 32 and causing reversal of the motor 78. The motor reversal effectuates sleeve rotation reversal, and thereby causes the stirring auger units to begin moving toward the opposite end of the sweep auger 12.

Referring now to FIG. 3, another embodiment of the sweep arm is shown. Sweep arm 100 differs from the preferred embodiment of FIG. 2 in that sweep arm 100 includes flighting 102 on the outer sleeve 104 which facilitates the accurate determination of stirring auger movement along the sweep arm 100 for each revolution of the sweep arm. When a flighted auger 100 is utilized, a second set of guide rollers (not shown) may be attached to each auger frame 32 (FIG. 1) to engage either side of the flighting, substantially as shown in the aforementioned Pat. No. 3,272,480.

In another alternative embodiment (FIG. 5), a single motor may be utilized to turn both the inner shaft and outer support sleeve. The motor (not shown) is mounted on the central frame 50 and directly drives the inner shaft 48 when activated, much like motor 53 of FIG. 1. A sprocket 210 is attached to the shaft 48 and drives a roller chain 212 that extends therearound. The chain 212 also extends around three direction reversing sprockets 214, 216, 218 which are mounted on a pivotally secured switch bracket 220. The bracket 220 is pivotal about securing bolt 222 which extends through opening 224 in switch bracket 220, and is secured to central frame 50. The plunger 226 of an electrical solenoid 227 is also secured to central frame 50 and is attached, via link portion 228, to switch bracket 220.

Figure 2:
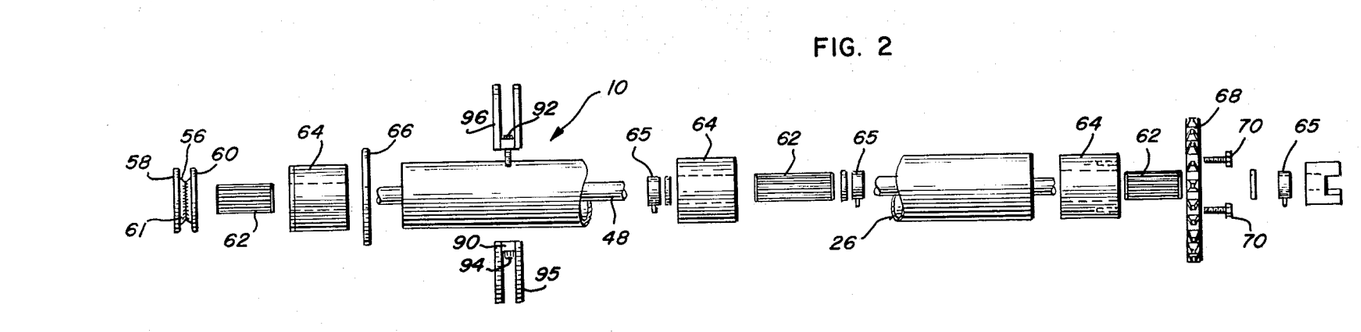
FIG. 2 is a fragementary side elevational view of the sweep arm of the embodiment of FIG. 1 shown in exploded relation.
Figure 5:
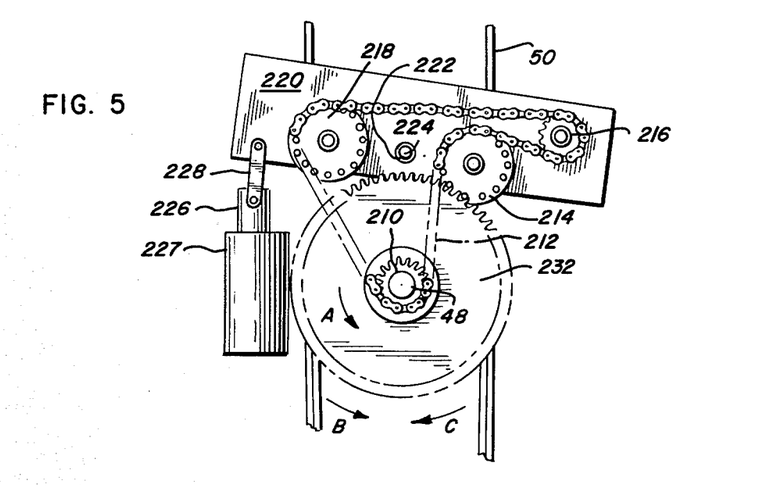
FIG. 5 is an end elevational view of a sweep arm reversing mechanism shown mounted on a central bin frame.

An outer sprocket 232 is rotatable about shaft 48 and is attached to the tube 26, e.g., as in FIG. 2, to be selectively engaged by the sprockets 214 and 218. Depending on the position of solenoid plunger 226, as determined by electrical impulses received, the switch bracket will be in position to drive outer sprocket 232 via sprocket 214 or sprocket 218. Arrow A depicts the direction of chain travel and inner sprocket 210 rotation, assuming shaft 48 is being driven in direction A. With the solenoid 227, and therefore switch bracket 220, in position as shown in FIG. 5, sprocket 218 is disengaged and sprocket 214 will drive outer sprocket 232, causing outer sprocket 232 to rotate in direction B, as illustrated by the arrow. When solenoid 227 receives an electrical impulse which causes switch bracket 220 to pivot about bolt 222 as plunger 226 moves downwardly, sprocket 214 will be disengaged and sprocket 218 will engage outer sprocket 232. This impulse is generated by the reversing switching means (not shown) carried on an auger unit 16, 18, 20 and responsive to the movement of rod 24 when the knob 80, 82 abuts against split plate 90, or drive sprocket 68. With sprocket 218 driving outer sprocket 232, the outer sprocket 232 will rotate in direction C, as represented by the arrow. As such, outer sprocket 232 and, therefore, outer sleeve 26 will rotate in a direction opposite to drive shaft 48. The direction in which the outer sprocket 232 and therefore support tube 26 will be rotated will thus depend on the positioning of the switch plate and, thus, which sprocket 214, 218 is driving the outer sprocket, even though the shaft 48 is continually rotating in the same direction.

Figure 6:
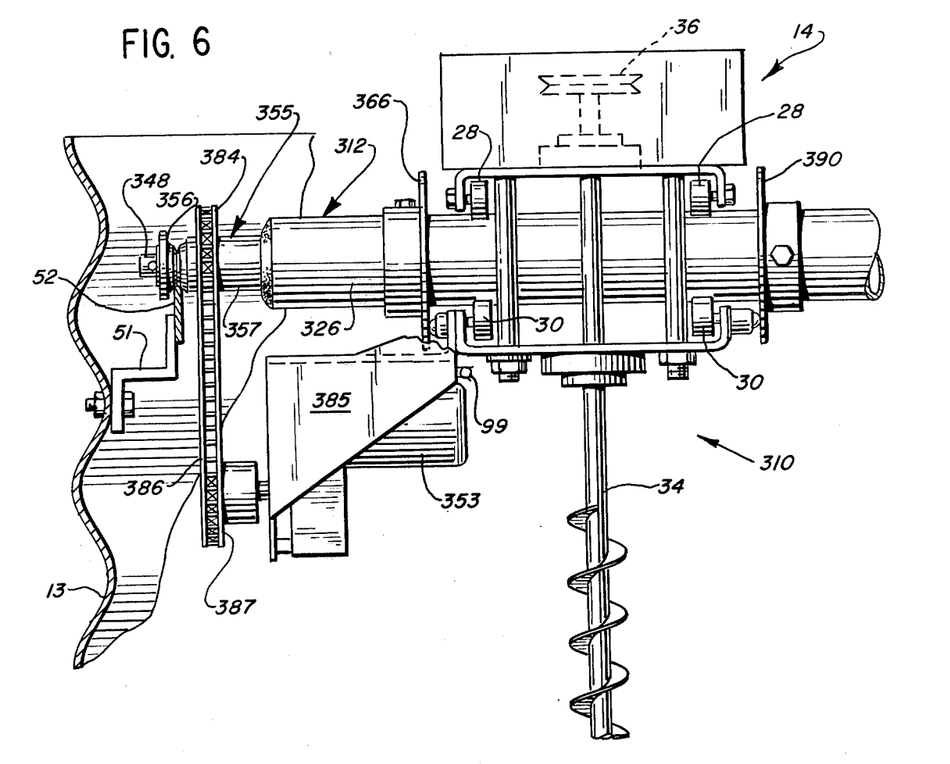
FIG. 6 is a partial side elevational view of another embodiment employing certain teachings of this invention.
Figure 7:
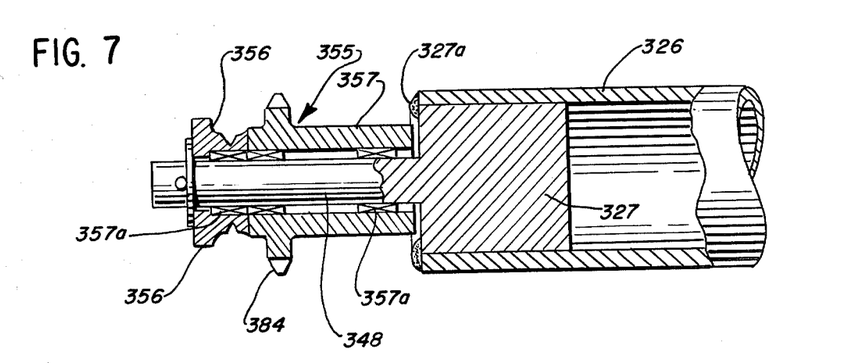
FIG. 7 is a sectional view of certain components of the embodiment of FIG. 6.

FIGS. 6 and 7 illustrate another embodiment 310 employing teachings of this invention. This embodiment maintains the simple, single axis, rotating support member design and utilizes two drive motors with the circumferential drive motor being mounted at the outer end of the sweep arm. Corresponding elements of the illustration of embodiment 310 are identified by the same numbers as referred to above in the 300 series.

The embodiment 310 utilizes a sweep arm 312 which spans from the track 52 to the center support structure for movably supporting one or more stirring units as in the embodiment of FIG. 1. As best seen in FIG. 7, the sweep arm 312 includes a support member 326, which may be of tubular form. A stub shaft element 327 is mounted in the outer end of the member 326, and fixed thereto as by welding at 327a. A short cantilever shaft portion 348 protrudes in coaxial alignment with the member 326 for rotatably supporting a drive element 355. The latter includes a drive wheel 356 affixed to a bearing and support sleeve 357 and is mounted over bearings 357a on the shaft 348. A sprocket 384 is fixed on the sleeve 357 whereby the drive element is driven by a gear motor 353 independently of the rotation of member 326.

The gear motor 353, is mounted on a bracket 385 which is supported on the frame of the stationary stirring unit 14. A roller chain 386 engages an output sprocket 387 and the sprocket 384. The stop flanges 366 and 390 affixed on member 326 maintain the axial position of unit 14 with sufficient accuracy to maintain adequate alignment of the sprockets 384 and 387. Moreover, since the driven sprocket 384 is coaxial with the member 326 on which the unit 14 and thus the motor assembly 353, 385, 387 is mounted, the chain will maintain its tightness adjustment and drive relationship regardless of any swinging movement of the unit 14 and the motor assembly. Any desired speed setting of the circumferential movement of the sweep arm 312 may be obtained by selecting and substituting sprockets 384 and 387 of appropriate ratios.

The support member 326 may be driven by a motor located either in the position of motor 53 or motor 78 of FIG. 1. Moreover, a stub shaft element (not shown) similar to the element 327 may be provided at the inner end of the support member 326 for support and bearing purposes, i.e., in place of the respective end portion of shaft 48.

Thus, it will be seen that the drive wheel 356 can be driven continuously and unidirectionally by the motor 353 while the member 326 is being rotated successively in opposite directions about its axis to effect the reciprocating movement of stirring units such as the units 16, 18 and 20 therealong. This embodiment presently is the preferred commercial embodiment.

Figure 8:
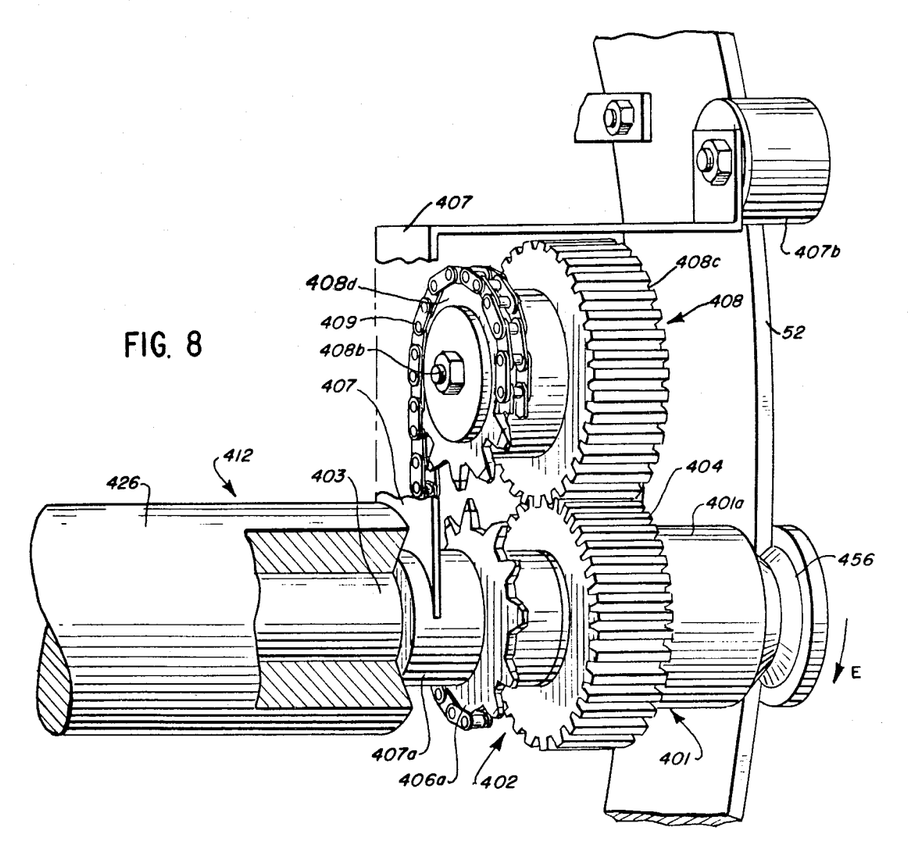
FIG. 8 is a partial perspective view of a drive assembly of a further embodiment employing certain teachings of this invention.
Figure 9:
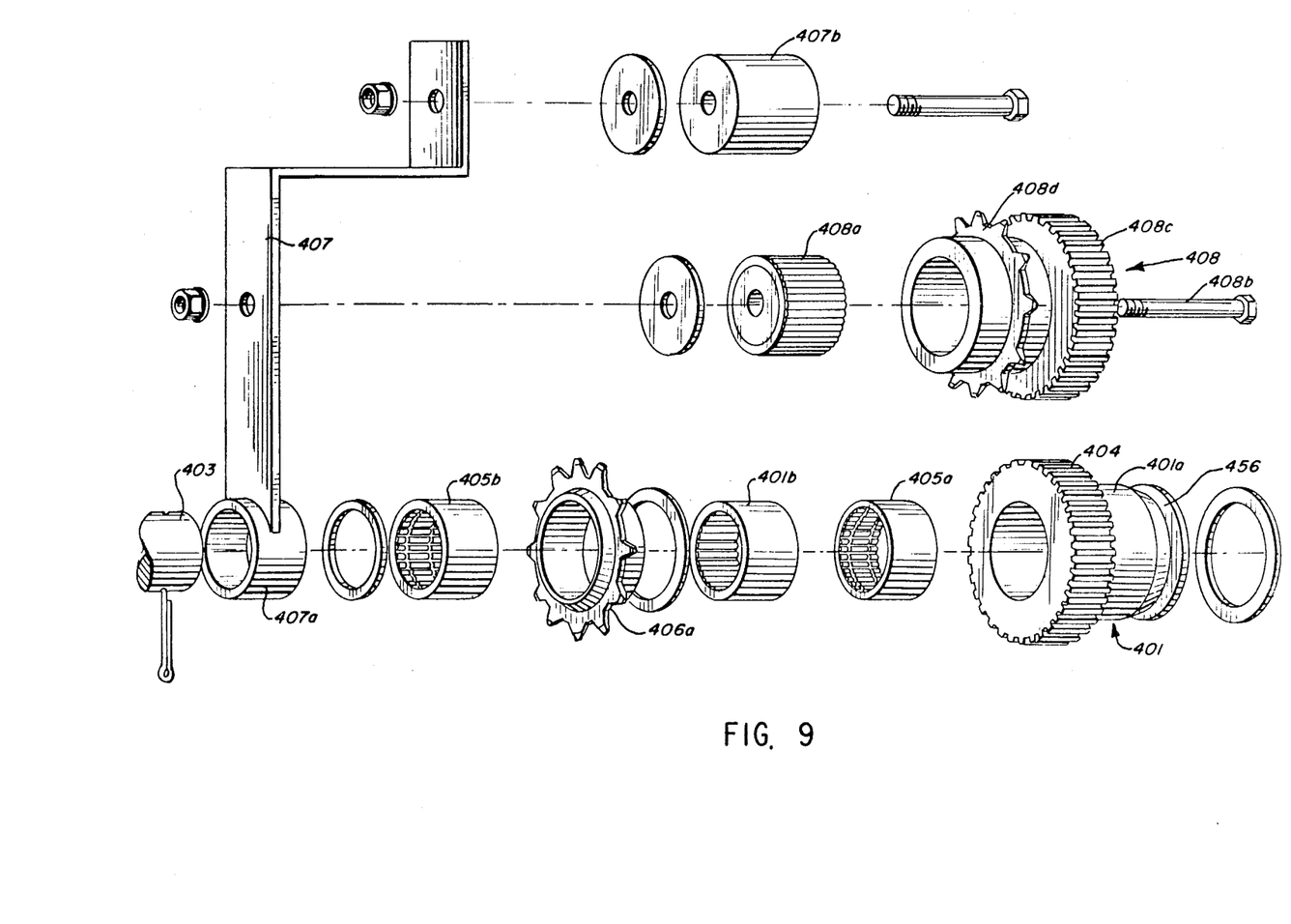
FIG. 9 is a perspective view of the component parts of the drive assembly of FIG. 8, shown in exploded relation.

FIGS. 8 and 9 illustrate yet another movement drive arrangement for stirring assemblies employing certain generic teachings of the invention. This embodiment was developed by another inventor and is the subject of a separate application to be filed in his name for claiming the particular inventive improvements incorporated therein. A brief description is included here to show another specific embodiment within the broader aspects of this invention. Various components of this drive arrangement are identified herein by numbers in the 400 series corresponding to the numbers assigned above.

The apparatus of FIGS. 8 and 9 includes a sweep arm 412 extending between and being supported by a pivotal center support 50, and the bin track 52. The sweep arm 412 includes a tubular support shaft 426 extending from the center support 50, and a drive unit 401 which extends over and rests on the bin track 52, to support the sweep arm 412 within the grain bin. A drive wheel 456 is part of the unit 401 and engages the track. The drive unit is coaxial with the support shaft 426 and is independently rotatable. A reversible drive motor 78 drives the support member 426, as in the embodiment of FIG. 1, and an automatic selective reverse drive assembly 402 is coupled between the member 426 and the drive unit 401. The reversing drive effects unidirectional rotation of the drive unit 401 in response to the rotation of the member 426, regardless of the direction of rotation of the latter. Thus the sweep arm is continuously advanced in one direction by the reversing drive from the rotation of member 426 as the latter is rotated alternately in opposite directions for positioning the movable stirring units therealong.

The drive unit 401 and reversing drive 402 are mounted on a reduced diameter shaft portion 403 which is fixed to and extends coaxially from the support member 426. The drive unit 401 includes the drive wheel 456 and a short sleeve section 401a with a spur gear 404 fixed thereon. A roller-type one way clutch bearing 405a and a support bearing 401b are fixed in the center bore of the drive unit and engage over the shaft 403. A second roller type one way clutch bearing 405b is fixed in sprocket 406a and is engaged over shaft 403 in an orientation opposite to clutch 405a. That is, clutches 405a and 405b are free-running in opposite directions of relative rotation on shaft 403. Each clutch will lock to the shaft to transmit torque from the shaft to the element in which the respective clutch is mounted upon attempted relative rotation between the shaft and the respective clutch in a reverse direction.

A support bracket 407 has one end attached to a sleeve 407a through which shaft 403 freely passes. A roller 407b is secured to the opposite end of bracket 407 and overlies track 52 to stabilize the bracket. A unified sprocket and gear unit 408 is supported on a bearing 408a mounted on bracket 407 by a bolt 408b. The gear 408c engages the gear 404. Sprocket 408d is aligned with sprocket 406a and is in drive relation therewith through a roller chain 409. Appropriate bearing washers are interposed between the components generally as illustrated.

As the support shaft 426-403 is rotated in one direction by the motor 78, i.e., clockwise in FIG. 8, the clutch 405a will frictionally grip the shaft 403 and thereby drive the unit 401 in the same direction. The engagement of the wheel 456 on the track 52 causes the sweep arm 412 to advance clockwise about the bin as indicated by the arrow E in FIG. 8. The reverse drive components 404, 408, 409, 406a will result in rotation of the sprocket 406a in the opposite direction. This relative counterrotation between the shaft 403 and the sprocket 406a is the direction of idling rotation of the clutch 405b, and thereby is accommodated. When the shaft 426-403 is rotated in an opposite direction by the motor 78, i.e., counterclockwise, the clutch 405b frictionally grips the shaft 403 and drives the sprocket 406a therewith in the same counterclockwise movement. The reversing drive components 406a, 409, 408, 404 thereupon drive the gear 404 and hence the unit 401 in a clockwise direction. Thus, the engagement of the wheel 456 on the track 52 continues to drive the sweep arm 412 in the clockwise direction E despite the reversal of the shaft 426-403. The corresponding counterrotation occurring between shaft portion 403 and the unit 401 is the direction of idling rotation of clutch 405a and thereby is accommodated.

Thus, it will be seen that with the reversing drive of FIGS. 8 and 9, a single reversible drive motor connected to the member 426, such as at 78, or which can be located in the position of motor 53, will effect both the reversing rotational movement of the support member of sweep arm 412 and the continuous unidirectional rotation of sweep drive wheel 456 throughout those reversals of the member 426. Thereby the sweep arm 412 is continuously advanced in one direction as the movable stirring units are moved inward and outward therealong, while maintaining the basic simple single axis rotatable support and movement system.

The embodiment of FIGS. 8 & 9 is illustrated arranged for clockwise movement of the sweep in the bin. Of course, the components equally can be reversed for counter clockwise movement as illustrated in the other embodiments.

Figure 4:
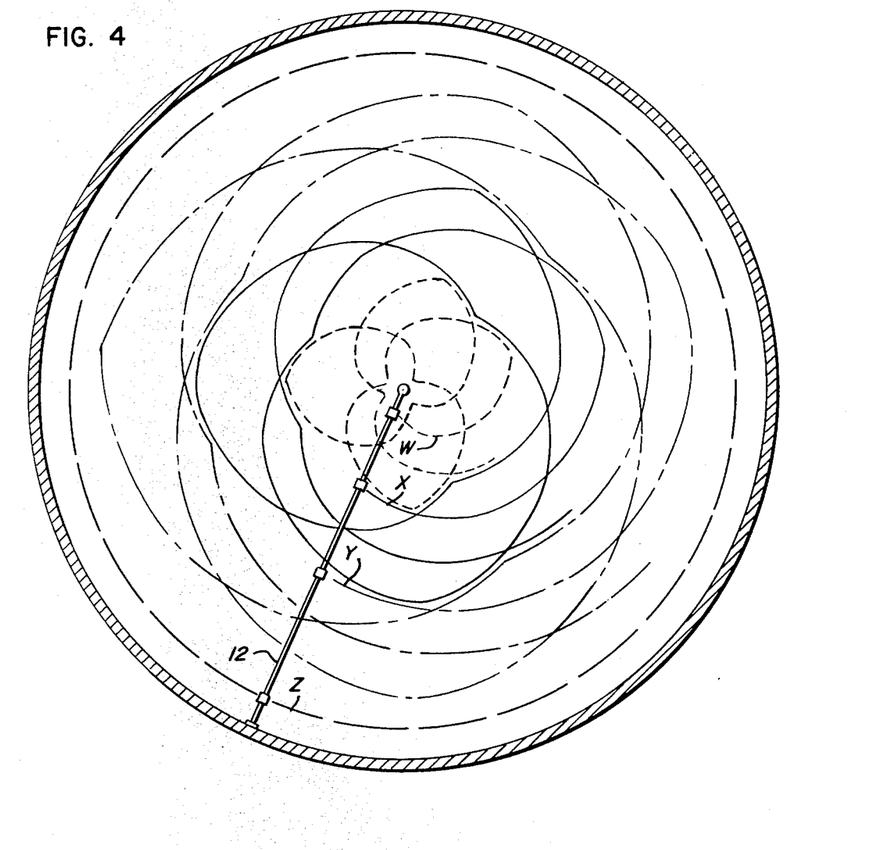
FIG. 4 is a schematic top plan view of a grain bin, with roof removed, showing the sweep arm in position therein and illustrating the stirring paths produced by each stirring auger during three revolutions of the sweep arm around the bin.

Referring now to FIG. 4, an example of the stirring auger paths generated as the sweep arm 12, 312, or 412 makes three complete counterclockwise revolutions of the grain bin is shown. The sweep arm 12 is illustrated when the stirring augers thereon are at their innermost extent, and it is assumed that the sweep arm is rotating counter-clockwise about the center of the bin as the stirring units first move radially outwardly. The arcuate path of each stirring auger is shown for 3¼ revolutions of the sweep arm 12 around the bin from the beginning position of FIG. 4. The paths of three movable stirrer units, such as units 16, 18 and 20, are traced at W, X, and Y. The path of the outer fixed stirrer unit such as unit 14 is traced at Z.

During the initial outwardly arced segment of each stirring auger path, the stirring units 16, 18, 20 are moving outwardly away from the bin center along the revolving support member 26, 326 or 426 of the sweep arm. Where each stirring auger path begins its inwardly arced curve, the movement of the stirring augers on the sweep arm has reversed, as initiated by a reversal in the axial rotation of the member 26, 326 or 426. The outermost stirring auger 14 does not move with the three inner augers, but remains at the outermost position, as illustrated. Referring to FIG. 1, this is achieved by mounting guide rollers 28, 30 so that they are not canted relative to the sweep arm rotation in either direction. Thereby, the support member 26 of the sweep arm 12 may rotate in either direction without effecting radial movement of the outermost stirring unit 14 along the sweep arm 12. In addition, split plate 90 is secured to sleeve 26 such that unit 14 has very restricted movement between stop disc 66 and split plate 90. Bearing rollers 97 are provided on auger unit 14 to avoid interference with the rotation of split plate 90 or stop disc 66 as mounted on sleeve 26 if the unit 14 does move slightly along the outer sleeve 26 and contacts surface 96 of split plate 90 or stop disc 66.

Split plate 90 also acts to limit movement of the moveable augers 16, 18, 20 along sleeve 26. As the knob 80 on line rod 24 approaches split plate 90, it will make contact with surface 95 thereof, triggering reverse rotation of the outer sleeve 26 and, therefore, reverse movement of stirring augers 16, 18, 20.

Mounted on the frame 32 of the auger unit 14 is a tilt-detecting cut-off switch 99 (FIGS. 1 and 6) which will stop the forward movement of the sweep arm 12, 312 or 412 if auger 34 of unit 14 lags significantly behind the sweep arm 12, until the auger 34 returns to a substantially vertical position. The tilt switch may be a mercury tube of a known type.

The out-and-in motion of the stirring augers along the sweep arm continues as the sweep arm revolves around the bin providing overlapping or contiguous foliate stirring paths illustrated by arcs W, X, Y, Z. As such, after approximately three revolutions of the sweep arm around the bin, substantially complete stirring of the grain has been achieved. As indicated above, the same patterns may be obtained with each of the embodiments.

The outermost auger unit 14 will repeatedly follow its same auger path during each revolution of the sweep arm. This allows the grain adjacent to the noninsulated bin wall to be stirred more frequently, which prevents grain damage when the outside air temperature is very cool and there is a greater chance for condensation adjacent to the bin wall.

It should be noted that by incorporating the teachings of this invention, a variety of stirring auger path patterns may be generated to meet the requirement of a particular application, without departing from the scope of this disclosure.

Thus, a grain-moving apparatus and method are provided that effectively assure movement of substantially all grain within a storage bin within predetermined time limits. The apparatus is simple in constuction and yet is adaptable to a variety of stirring requirements within a bin.

In another embodiment, stop plate 90 may be eliminated and the outer auger unit 14 may be of the same design and tied to the remaining unit for corresponding radial reciprocating movement along sweep tube 26. In that event, outer plate 66 becomes the end stop plate.

While particular embodiments of the invention have been shown it will be understood that the invention is not limited thereto since further modifications may be made and other embodiments of the principles of this invention envisioned upon considering the foregoing teachings. It is therefore contemplated by the appended claims to cover any such modifications and other embodiments as incorporate those features which constitute the essential features of this invention within the spirit and scope of the following claims.

What is claimed is:

1. An apparatus for moving grain within a storage bin comprising a laterally-extending sweep member suspended at a first end by a pivotal support means and at a second end by a track means secured to the storage bin, said sweep member including an outer sleeve and an inner shaft independently rotatable, drive means secured to said inner shaft and engaging said track means, at least one stirring member moveably carried on said outer sleeve and depending from said sweep member, means for moving said stirring member inwardly and outwardly along said sweep member in accordance with the direction of rotation of said outer sleeve, and drive mechanism to selectively rotate or counterrotate said outer sleeve and continuously rotate said inner shaft, whereby said sweep member is suspended on said track means by said inner shaft and said drive means propels said sweep member along said track means, and the selective rotation of said outer sleeve causes selective movement of said stirring member along said sweep member.

2. The apparatus of claim 1, wherein said drive mechanism is mounted on said pivotal support means in a predetermined relation to said sweep member.

3. The apparatus of claim 1, wherein the directional rotation of said outer sleeve may be selectively determined to position said stirring member to achieve a desired stirring path as said sweep member moves around said bin.

4. The apparatus of claim 3, including another stirring member on said sweep member which remains in substantially the same position on said sweep member.

5. The apparatus of claim 4, wherein said last-mentioned stirring member is adjacent to said second end of said sweep member, and said sweep member includes a plurality of moveable stirring augers along said sweep member.

6. The apparatus of claim 5, wherein a tilt-activated control switch is mounted on said auger adjacent to said second end of said sweep member.

7. The apparatus of claim 3, wherein a switching mechanism mounted between said drive mechanism and said inner shaft and outer sleeve drives said inner shaft in a first direction and selectively drives said outer sleeve either in said first direction or a second direction.

8. The apparatus of claim 7, wherein said switching mechanism includes a pivotal support member, first and second rotary drive means mounted on said pivotal support member, means drive connected to said inner shaft and driving said rotary drive means continuously in opposite directions, and means for selectively engaging said first or second rotary drive means with said outer sleeve of said sweep arm to effect rotation or counterrotation of said sleeve, relative to the rotation of said inner shaft.

9. The apparatus of claim 8, wherein the pivotal support member is moveable between first and second positions to selectively engage said first or second rotary drive means with said outer sleeve of said sweep arm.

10. The apparatus of claim 9, wherein said pivotal support member is moved into said first or second position by an impulse-activated electrical solenoid.

11. The apparatus of claim 7, wherein said switching mechanism includes an electrical impulse activated solenoid and tiltable switch plate mounted on said central frame, first, second and reversal sprockets carried on said switch plate, an inner shaft sprocket, a drive chain extending around said sprockets and driven by said inner shaft sprocket, and an outer sleeve gear, whereby the position of said tiltable switch plate is determined by impulses received by said solenoid, and when in a first position said first sprocket on said switch plate intermeshes with said outer sleeve gear to cause said outer sleeve to rotate in a first direction, and when in a second position the second sprocket on said switch plate intermeshes with said outer sleeve gear to cause said outer sleeve to rotate in a second direction.

12. A method for generating an effective stirring path within a grain storage bin provided with at least one stirring auger depending from a laterally-extending sweep arm suspended between a central pivotal support and a bin track, which includes an outer sleeve and an inner shaft, comprising: applying a continuous rotational force to one end of the sweep arm's inner shaft, transmitting the continuous rotational force to the opposite end of the inner shaft, and to a drive wheel carried on the bin track and secured to the end of the inner shaft, to effect movement of the sweep member around the bin, applying a selective rotational or counterrotational force to one end of the sweep arm's sleeve, transmitting the selective rotational or counterrotational force along the outer sleeve to canted rollers carried on the stirring auger, and reversing, selectively, the directional force transmitted through the outer sleeve to effect corresponding positional movement of the stirring auger along the sweep arm, whereby the selective reversal and corresponding change in position of each stirring auger along the sweep arm and continuous movement of the sweep arm around the bin generates an effective stirring path within a grain storage bin.

13. An apparatus for moving grain in a storage bin comprising a laterally extending sweep member suspended at a first end by a pivotal support means and a second end by a track means secured to the storage bin, said sweep member carrying at least one stirring member movably carried on and depending from said sweep member, a stationary stirring member carried on said sweep member and provided with a tilt control unit to maintain said stationary stirring member in a substantially downwardly extending position, and drive mechanism to selectively move said moveable stirring auger along said sweep member, whereby an effective grain stirring path is generated as said sweep member moves around the storage bin.

14. The apparatus of claim 13, wherein said track means is secured to a storage bin wall, and said stationary stirring member is carried on said sweep member adjacent to said track means.

15. The apparatus of claim 13, wherein said tilt control unit delays forward movement of the sweep member around the bin when said stationary stirring member lags behinds said sweep member, and until said stationary member extends substantially downwardly.

16. An apparatus for moving grain within a storage bin comprising a laterally extending sweep member suspended at an inner end portion by a pivotal support means and at an outer end portion by a track means secured to the storage bin; said sweep member including a sweep drive element in supporting and drive-engaging relation with said track means, and an auger support and movement element rotatable directionally independently of said drive element; at least one stirring member movably carried on said auger support and movement element and depending therefrom; means for moving said stirring member inwardly and outwardly along said auger support and movement element in accordance with the direction of rotation of said auger support and movement element; and drive mechanism to selectively rotate or counterrotate said auger support and movement element and continually rotate said drive element in one direction during such rotation and counterrotation of said auger support and movement element; whereby said drive element propels said sweep member along said track means in one direction while said selective rotation of said auger support and movement element causes selective movement of said stirring member inwardly and outwardly along said sweep member.

17. The apparatus of claim 16, wherein the directional rotation of said auger support and movement element may be selectively determined to position said stirring member to achieve a desired stirring path as said sweep member moves around said bin.

18. The apparatus of claim 17, including another stirring member on said sweep member which remains in substantially the same position on said sweep member.

19. The apparatus of claim 18, wherein said last-mentioned stirring member is adjacent to said outer end portion of said sweep member, and a plurality of movable stirring members along said auger support and movement element.

20. The apparatus of claim 19, wherein a tilt-activated control switch is mounted on said stirring member adjacent to said outer end portion of said sweep member.

21. The apparatus of claim 16, wherein said sweep drive element is rotatably and supportably mounted on an outer end portion of said support and movement element.

22. The apparatus of claim 16, wherein said drive mechanism includes a first motor drive connected to said support and movement element for effecting rotation and counterrotation thereof, and a second motor drive connected to said sweep drive element for propelling said sweep member along said track means.

23. The apparatus of claim 16, wherein said drive mechanism includes means for selective reversible drive interconnection between said sweep drive element and said support and movement element, and motor means connected to said sweep member and effecting simultaneously said rotation of said drive element in one direction, and said rotation and counterrotation of said support and movement element.

24. The apparatus of claim 23 wherein said drive mechanism comprises a single motor directly connected to said drive element, and said selective reversible drive means being connected for reversible drive of said support and movement element therefrom.

25. The apparatus as in claim 16 wherein said drive element is coaxially aligned with said support and movement element.

26. The apparatus of claim 25 wherein said sweep drive element is rotatably and supportably mounted on an outer end portion of said support and movement element; and said drive mechanism includes a first motor supported adjacent said outer end portion and drive connected to said drive element for effecting rotation of said drive element, and a second motor drive connected to said support and movement element for effecting such rotation and counterrotation thereof.

27. The apparatus of claim 26 including a stirring member and support frame therefor pivotally supported on said sweep member, means for retaining said support frame and stirring member in a fixed position adjacent the outer end portion of said sweep member, and said first motor being supported on said support frame.

28. A method for generating an effective stirring path within a grain storage bin provided with at least one stirring auger depending from a laterally-extending sweep member suspended between a central pivot and a bin track, comprising: applying a continuous rotational force to a sweep member drive wheel carried on the bin track and independently rotatably mounted on the sweep member toward the outer end thereof to effect movement of the sweep member around the bin; applying a selective rotational or counterrotational force to one end of the sweep member; transmitting the selective rotational or counterrotational force along the sweep member to the stirring auger in a manner to effect movement of said stirring auger inward and outward along said sweep member and; reversing, selectively, the directional force transmitted through the sweep member to effect corresponding positional movement of the stirring auger along the sweep member; whereby the selective reversal and corresponding change in position of each stirring auger along the sweep member and continuous movement of the sweep member around the bin generates an effective stirring path within the grain storage bin.

* * * * *

UNITED STATES PATENT AND TRADEMARK OFFICE
CERTIFICATE OF CORRECTION

PATENT NO. : 4,248,538
DATED : February 3, 1981
INVENTOR(S) : Eugene G. Sukup

It is certified that error appears in the above-identified patent and that said Letters Patent are hereby corrected as shown below:

Column 2, line 3, "simultaneous" should read -- simultaneously --. Column 3, line 58 "(now shown)" should read -- (not shown) --. Column 11, line 50 (claim 15) "behinds" should read -- behind --.

Signed and Sealed this

Twenty-sixth Day of May 1981

[SEAL]

Attest:

RENE D. TEGTMEYER

Attesting Officer    Acting Commissioner of Patents and Trademarks